United States Patent

Ortiz, Jr. et al.

[11] Patent Number: 5,289,553
[45] Date of Patent: Feb. 22, 1994

[54] LENS HOLDING SYSTEM FOR FIBER OPTIC OUTPUT COUPLERS

[75] Inventors: Angel L. Ortiz, Jr., Scotia; John L. August, Schenectady, both of N.Y.

[73] Assignee: General Electric Company, Schenectady, N.Y.

[21] Appl. No.: 17,883

[22] Filed: Feb. 16, 1993

[51] Int. Cl.$^5$ ................................................ G02B 6/36
[52] U.S. Cl. ........................................ 385/74; 385/76; 385/33
[58] Field of Search ............... 385/88, 74, 53, 76, 385/77, 78, 79, 93, 147, 33; 219/121.61, 212.78, 121.75

[56] References Cited

U.S. PATENT DOCUMENTS

| | | | |
|---|---|---|---|
| 3,419,321 | 12/1968 | Barber et al. | 385/147 |
| 4,204,743 | 5/1980 | Etaix | 385/88 |
| 4,275,288 | 6/1981 | Makosch et al. | 219/121.75 |
| 4,564,736 | 1/1986 | Jones et al. | 219/121.6 |
| 4,676,586 | 6/1987 | Jones et al. | 385/33 |
| 4,707,073 | 11/1987 | Kocher | 385/33 X |
| 4,749,250 | 6/1988 | Carter | 385/33 X |
| 4,753,521 | 6/1988 | Deserno | 385/33 X |
| 4,799,755 | 1/1989 | Jones | 385/38 |
| 4,844,574 | 7/1989 | Chande | 385/33 |
| 4,861,396 | 8/1989 | Matsuo et al. | 148/439 |
| 4,868,361 | 9/1989 | Chande et al. | 219/121.62 |
| 4,997,250 | 3/1991 | Ortiz, Jr. | 385/33 |
| 5,054,877 | 10/1991 | Ortiz, Jr. et al. | 385/33 |
| 5,142,600 | 8/1992 | Ortiz, Jr. | 385/83 |

*Primary Examiner*—John D. Lee
*Assistant Examiner*—Hemang Sanghavi
*Attorney, Agent, or Firm*—Paul R. Webb, II

[57] ABSTRACT

This invention relates to high power laser systems of the type which, typically, operate at up to 500 watts of average power in the high average power mode and up to 75 joules per pulse in the high energy mode, and has a lens system which is constructed of several individual pieces in order to form an integral lens holding system that maximizes the useful lens aperture. Such structures of this type, generally, allow a laser/fiber user to quickly change lenses, while simultaneously maintaining optical alignment when the lens is replaced.

9 Claims, 2 Drawing Sheets

LENS HOLDING SYSTEM FOR FIBER OPTIC OUTPUT COUPLERS

BACKGROUND OF THE INVENTION

Field of the Invention

This invention relates to high power laser systems of the type which, typically, operate at up to and over 500 watts of average power in the high average power mode and up to and over 75 joules per pulse in the high energy mode, and has a lens system which is constructed of several individual pieces in order to form an integral lens holding system that maximizes the useful lens aperture. Such structures of this type, generally, allow a laser/fiber user to quickly change lenses, while simultaneously maintaining optical alignment when the lens is replaced.

Laser materials processing as known in the art and as used herein refers to the performance of materials processes such as cutting, welding, drilling and soldering using a high power continuous wave or pulsed laser beam. The average power of a high power laser beam may range from as little as approximately 1 watt to hundreds of watts. As user selects the specific power of the beam on the basis of the particular process being performed.

Known art describes transmitting a laser beam from a laser source in the vicinity of a workpiece by means of an optical fiber. For example, an apparatus and method for injecting a power laser beam into an optical fiber for transmission therethrough are described in commonly assigned U.S. Pat. Nos. 4,564,736, 4,676,586 and 4,681,396, entitled "Industrial Hand-Held Laser Tool and Laser System", "Apparatus and Method for Performing Laser Material Processing Through a Fiber Optic" and "High Power Laser Energy Delivery System", respectively.

Transmitting a laser beam through an optical fiber to an output coupler also is known. Such an apparatus is described in commonly assigned U.S. Pat. No. 4,799,755, entitled "Laser Material Processing with a Lensless Fiber Optic Output Coupler". In the apparatus described in U.S. Pat. No. 4,799,755, lens systems are not utilized in an output coupler. Rather, a fiber injecting lens is selected to have a focal length of sufficient length to enable the use, for materials processing, of the diverging beam emitted at an output end of the fiber without a need for a beam focusing lens-type output coupler.

An output coupler having a lens system therein for focusing a laser beam transmitted thereto through an optical fiber is disclosed in commonly assigned U.S. Pat. No. 4,844,574, entitled "Optical Fiber Output Coupler for a Power Laser". The apparatus described in U.S. Pat. No. 4,844,574, includes a lens system that compensates for adverse affects of fiber transmission in order to improve focused spot power density of the fiber transmitted beam. The lens system illustrated in U.S. Pat. No. 4,844,574 causes the beam to undergo focusing action within the output coupler. In high power beam transmission, however, focusing a beam within a coupler is undesirable because the focused beam may cause air in the coupler to ionize. The ionized air will deflect the high power laser beam passing through the coupler and the beam may impinge against and damage components within the coupler. At column 12, lines 9-16, of U.S. Pat. No. 4,844,574, it is pointed out that a planoconcave or double concave lens, which will provide a diverging beam, could be utilized, thereby eliminating problems related to focusing the beam within the coupler.

Still other known laser material processing systems utilize lens systems at an output of laser source. Such systems are described in U.S. Pat. Nos. 3,419,321 and 4,275,288, entitled "Laser Optical Apparatus for Cutting Holes" and "Apparatus for Machining Material", respectively. In each of these systems, optical fibers are not utilized. Therefore, since a laser source generally is a stationary system, at least during a materials processing operation, lenses are aligned with the beam directing output by the laser source. But mobility of such systems is limited.

Further, lens holding mechanisms are well known in the art. Exemplary of such prior art lens holding mechanisms are U.S. Pat. Nos. 4,868,361 and 4,997,250, respectively entitled "Coupling Device for High Power Laser Beam Transmitting Optical Fibers" and "Fiber Output Coupler with Beam Shaping Optics for Laser Materials Processing System". While these systems have met with a modicum of success, they are made up, of necessity, of numerous parts. Due to the shear number of these parts and their complex arrangement, all necessary to properly transmit the beam, they do not necessarily maximize the useful lens aperture.

Still further other lens holding mechanisms such as spring loaded arm configurations which grasp the lens, round annular threaded rings such as those found on camera lens assemblies, adjustable lens holders using dual bars, "V-blocks", and adhesive holders have been employed. Again, none of these lens holding mechanisms maximize the useful lens aperture of the fiber optic output coupler. Therefore, a more advantageous lens holding system, then, would be presented if the lens aperture could be maximized.

It is apparent from the above that there exists a need in the art for a lens holding system for fiber optic output couplers which is light weight through simplicity of parts and uniqueness of structure, and which at least equals the beam focusing characteristics of the known lens holders, but which at the same time is capable of maximizing the useful lens aperture. It is a purpose of this invention to fulfill this and other needs in the art in a manner more apparent to the skilled artisan once given the following disclosure.

SUMMARY OF THE INVENTION

Generally speaking, this invention fulfills these needs by providing a lens holding apparatus for a fiber optic output coupler, comprising a fiber optic output coupler receiver means having a fiber optic, a first holder means rotatably connected to said receiver means, a first lens holding and aligning means rotatably connected to said first holder means, a first lens means substantially located within said first lens holding and aligning means, a main body means rotatably connected to said first holder means such that said first lens holding and aligning means and said first lens means are substantially located within said main body means, a second lens holding and aligning means rotatably connected to said main body means, a second lens means substantially located within said second lens holding and aligning means and a first fiber optic output coupler end means rotatably attached to said second lens holding and aligning means.

In certain preferred embodiments, the first lens holding and aligning means includes a retainer ring, two lens holders and aligners, and a lens retainer. Also, the first lens means includes two 10 millimeter diameter fused silica lenses. Also, the second lens holding and aligning means includes two lens holders and aligners, a retaining ring and a lens retainer. Finally, the second lens means includes two 15 millimeter in diameter fused silica lenses.

Another further preferred embodiment of the lens holding apparatus allows for the optical lenses to be aligned by using a minimal lens surface area thereby maximizing the lens clear aperture while maintaining precise optical alignment.

The preferred lens holding system, according to this invention, offers the following advantages: lightness in weight; ease of assembly or disassembly; excellent lens holding characteristics; maximizing the useful lens aperture; good stability; good durability; excellent lens alignment; good economy; and high strength for safety. In fact, in many of the preferred embodiments, these factors of ease of assembly and disassembly, lens holding, maximizing the lens aperture, and lens alignment are optimized to an extent that is considerably higher than heretofore achieved in prior, known lens holding systems.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1:
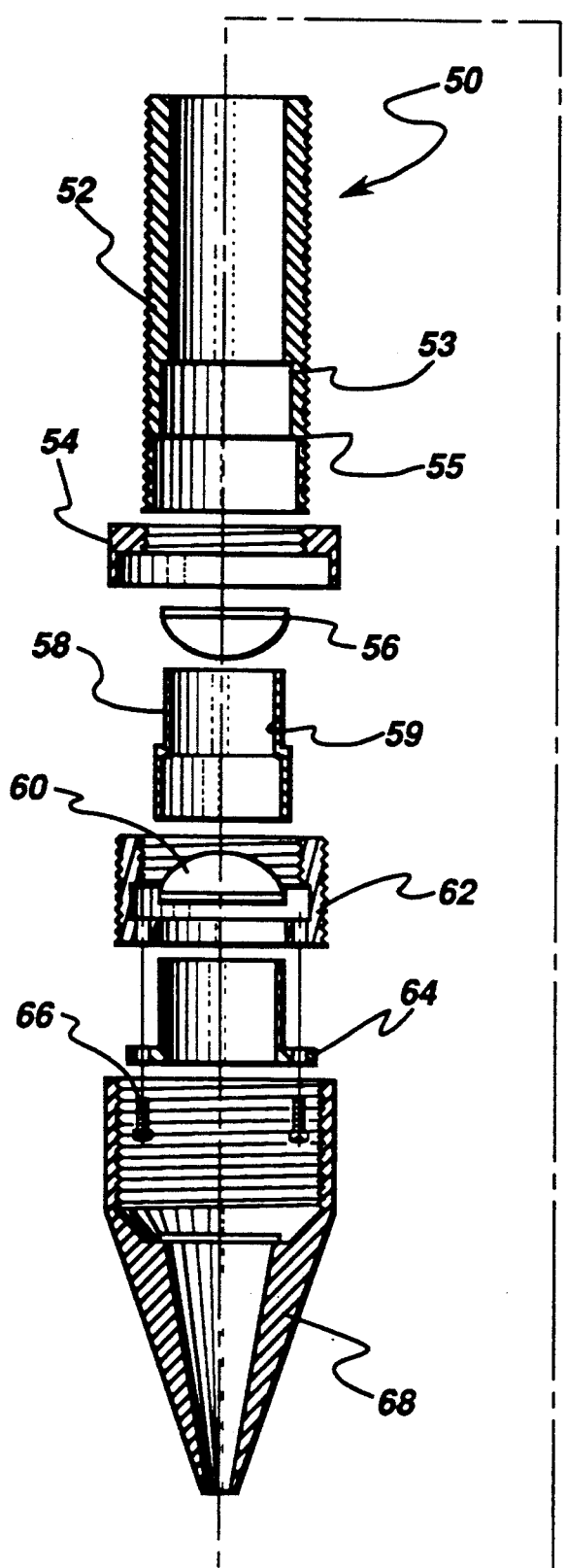
FIG. 1 is an exploded view of the component parts of the lens holding system for fiber optic output couplers, according to the present invention.
Figure 1:
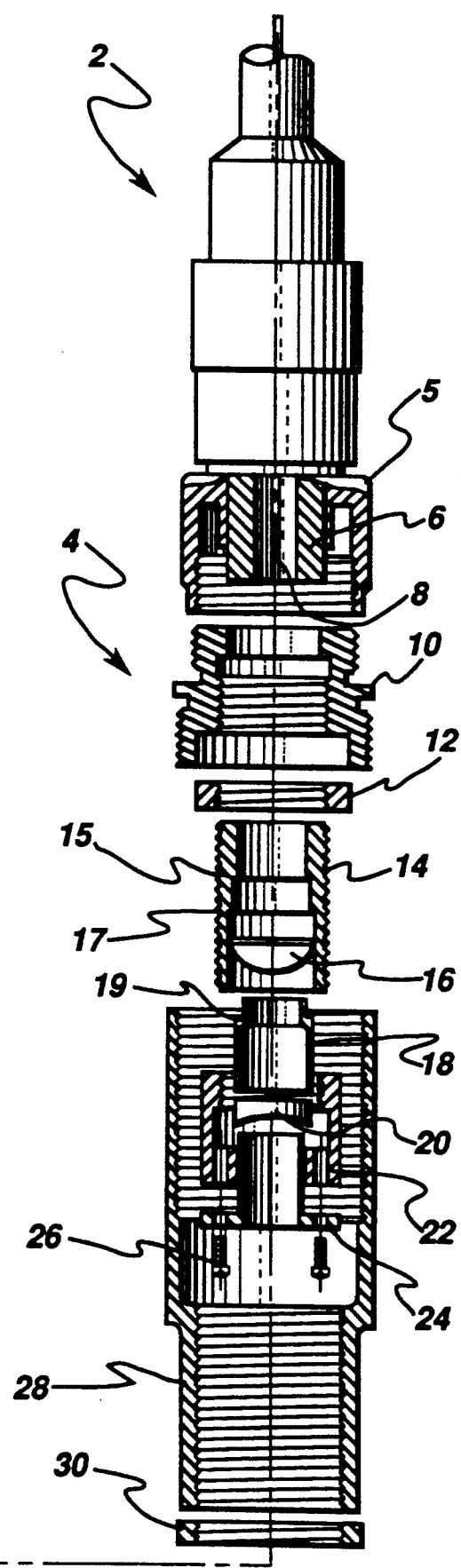

With reference first to FIG. 1, there is illustrated lens holding system 2 for use in fiber optic output couplers. System 2 includes, in part, upper assembly 4 and lower assembly 50. Upper assembly 4 includes, receiver 5, fiber holder 6, fiber optic 8, holder 10, retainer ring 12, lens holder and aligner 14, lens 16, lens retainer and aligner 18, lens 20, holder 22, lens retainer 24, conventional fasteners 26, main body 28, retainer ring 30 and alignment beam 70. Receiver 5, preferably, is a quick connect/disconnect receiver such as that disclosed in commonly assigned U.S. Pat. No. 5,142,600, entitled "Optical Fiber Quick Connect/Disconnect For a Power Laser". Receiver 5 includes a conventional fiber holder 6 which holds a conventional fiber optic 8. Rotatably attached to receiver 5 is holder 10. Located within holder 10 is retainer ring 12. Rotatably attached to holder 10 is lens holder and aligner 14. Located within lens holder and aligner 14 are notches 15, 17. Located within lens holder and aligner 14 is lens 16. Lens 16, preferably, is a 10 millimeter fused silica planoconcave lens. Located within lens holder and aligner 14 is lens retainer and aligner 18. Located within lens retainer and aligner 18 is notch 19. Located within lens retainer and aligner 18 is lens 20. Lens 20, preferably, is a 10 millimeter plano-convex lens and is constructed of the same material as lens 16. Rotatably attached to lens holder and aligner 14 is holder 22. Rotatably attached to holder 22 is lens retainer 24. Conventional fasteners 26 are used to hold lens retainer 24 onto holder 22. Main body 28 is rotatably attached to holder 10. Finally, retainer ring 30 is rotatably attached to lens holder and aligner 52 of lower assembly 50. Elements 5, 6, 8, 10, 12, 14, 18, 22, 24, 26, 28 and 30, preferably are constructed of aluminum.

With respect to lower assembly 50, assembly 50 includes, lens holder and aligner 52, retainer ring 54, lens 56, lens holder and aligner 58, lens 60, holder 62, lens retainer 64, conventional fasteners 66, and output end 68. In particular, lens holder and aligner 52 is rotatably attached to main body 28 and retainer ring 30. Retainer ring 54 is rotatably attached to lens holder and aligner 52. Lens 56, is substantially located within lens holder and aligner 52 and abuts against notch 53 in aligner 52. Lens 56, preferably, is a 15 millimeter diameter planoconcave fused silica lens. Lens holder and aligner 58 is located within lens holder and aligner 52, abuts against notch 55 in aligner 52, and is used to retain lens 56 within lens holder and aligner 52. Lens 60 is located within lens holder and aligner 58 and abuts against notch 59 in aligner 58. Lens 60 is constructed substantially the same as lens 56. Holder 62 is rotatably attached to lens holder and aligner 52. Lens retainer 64 is rigidly attached to holder 62 by conventional fastener 66. Lens retainer 64 is used to retain lens 60 within notch 59 of lens holder and aligner 58. Finally, a conventional output end 68 is rotatably attached to holder 62. Output end 68 can be any output end which is capable of performing a material process such as cutting, welding, drilling and/or soldering. Elements 52, 54, 58, 62, 64 and 66, preferably, are constructed of aluminum.

Figure 2:
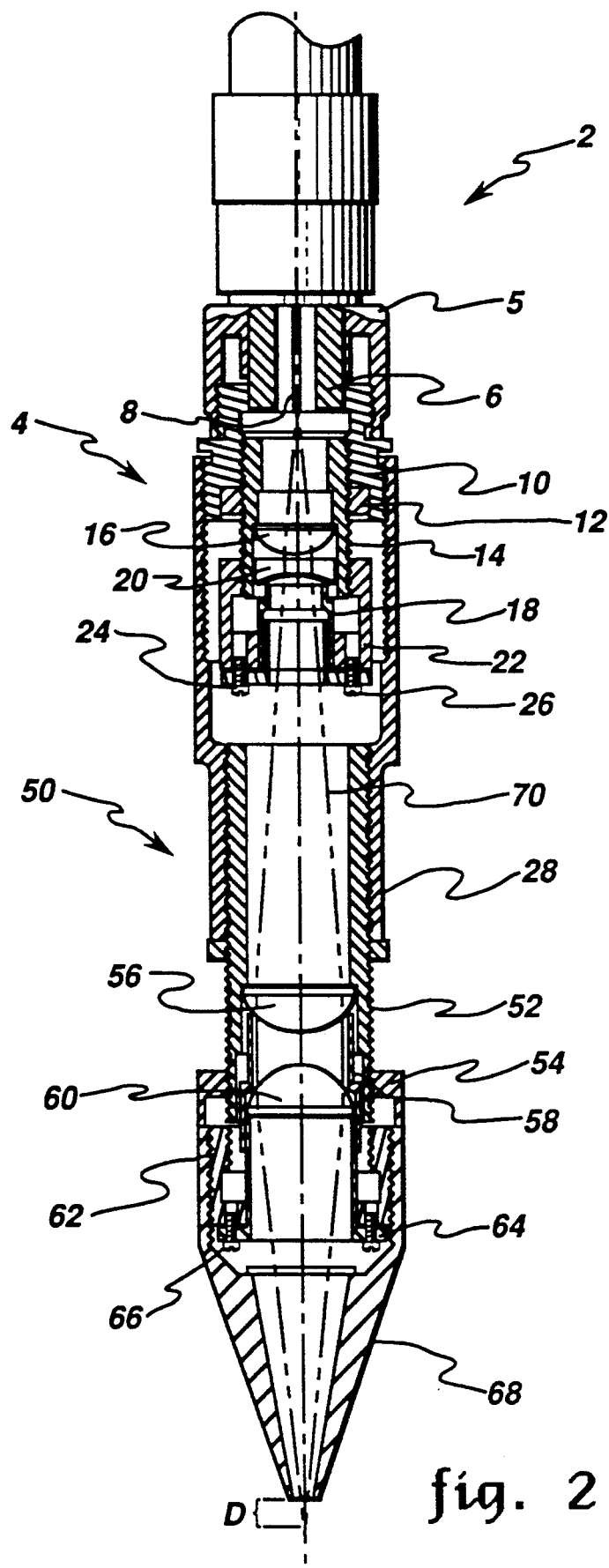
FIG. 2 is a side plan view of a constructed lens holding system for fiber optic couplers, according to the present invention.

With respect to the construction of lens holding system 2, FIG. 2 illustrates a completely constructed lens holding system. In particular, in order to construct lens holding system 2, holder 10 is placed within receiver 5 and rotated such that holder 10 bottoms out against receiver 5. Retainer ring 12 is placed within holder 10. Lens holder and aligner 14 is placed within retainer ring 12 and holder 10. Lens 16 is placed within lens holder and aligner 14 such that lens 16 abuts against notch 15 (FIG. 1) of aligner 16. Lens retainer and aligner 18 is inserted into lens holder and aligner 16 such that lens retainer and aligner 18 abuts up against lens 16. In this manner, lens retainer and aligner 18 only holds the edges of lens 16 against lens holder and aligner 14. Aligner 18 is then held in place by holder 22. This provides maximal use of the aperture of lens 16. After lens 16 is held in place, a conventional alignment beam 70 is produced by a Helium:Neon or low power Nd:YAG source (not shown) and emitted out of fiber optic 8. The alignment beam impinges on lens 16. Aligner 14, which now contains lens 16, is rotated by a conventional rotating tool until a collimated beam image in the far field is produced which is both crisp and round. This technique is a conventional one for properly focusing a beam on a lens. Once lens 16 is properly aligned, ring 12 is rotated such that aligner 14 is locked into place and the alignment of lens 16 is maintained.

After lens 16 is aligned, holder 22 is then rotated off of aligner 14 and lens 20 is placed in aligner 18 such that lens 20 abuts against notch 19 (FIG. 1) of aligner 18. At this point notch 19 (FIG. 1) is then abuts against notch 19 in lens holder and aligner 14. After lens 20 is inserted in the lens retainer and aligner 18, holder 22 is rotated on lens holder and aligner 14 such that holder 22 bottoms out against lens retainer and aligner 18. Lens retainer 24 is placed into holder 22 such that retainer 24 holds lens 20 against notch 19 (FIG. 1). This position of retainer 24 against lens 20 provides the maximal useful lens aperture of lens 20. Retainer 24 is then fastened against holder 22 by fasteners 26.

Once upper assembly 4 is completed, main body 28 is rotated onto holder 10 such that main body 28 bottoms out against holder 10. Lens holder and aligner 52 of lower assembly 50 is rotated into main body 28. Retainer ring 30 is rotated onto lens holder and aligner 54 such that retainer ring 30 approaches main body 28. Lens 56 is inserted into lens holder and aligner 52 such that lens 56 abuts against notch 53 (FIG. 1) in lens holder and aligner 52. Lens holder and aligner 58 is inserted into lens holder and aligner 52 such that lens holder and aligner 58 holds the edges of lens 56 against notch 53 (FIG. 1). Again, as with lens holder and retainer 18, lens holder and aligner 58 only holds the edges of lens 56 against lens holder and aligner 52. This maximizes the useful lens aperture of lens 56. Holder 62 is rotated onto lens holder and aligner 52 such that lens holder and aligner 58 holds lens 56 against lens holder and aligner 52. The alignment beam 70 is again used in order to align lens 56. Again, as with the alignment of lens 16, a collimated beam image in the far field which is crisp and round should be produced by the proper alignment of lens 56. This is accomplished by rotating aligner 52 until a crisp image appears. At this point, retainer ring 30 is rotated such that lens holder and aligner 52 in its proper position to provide the proper alignment of lens 56.

After lens 56 is properly aligned, holder 62 is removed and lens 60 is placed within lens holder and aligner 58 such that lens 60 abuts against notch 59 (FIG. 1) in lens holder and aligner 58. At this point, lens 60 abuts against notch 59 (FIG. 1) of lens holder and aligner 58 which abuts against notch 55 (FIG. 1) of lens holder and aligner 52. Lens retainer 54 is placed within lens holder and aligner 52 to hold the edges of lens 60 against notch 59 such that the use lens aperture of lens 60 is maximized. Fasteners 66 are then used to rigidly retain lens retainer 64 onto holder 62. Finally, a conventional output end 68 is rotatably attached onto holder 62 such that holder 68 bottoms out against holder 62. At this point lenses 56 and 60 of lower assembly 50 are in proper alignment.

After lens system 2 has been constructed, the user then needs to determine the desired standoff or lens-to-nozzle distance (D) (FIG. 2) by conventional techniques. Also, it is to be understood that various diameter lenses could be held within the mechanical means described as long as the appropriate mechanical means have been machined to accept lenses of choice. Likewise, while the embodiment indicates plano-convex lenses, cylindrical lenses could also be used instead. Also, the lenses could be replaced with other optical elements, for example, axicons, segmented prisms, segmented lenses, or various other optical configurations. The lens holding system can be modified for holding only a single optical element. Likewise three or more optical elements could be simultaneously held. Finally, the beam emitted from fiber optic 18 could be split in such a manner as described in U.S. Pat. No. 5,054,877, entitled "Multi-Fiber Optical Coupler for a High Power Laser" and assigned to the same assignee as the present invention.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A lens holding apparatus for a fiber optic output coupler, wherein said apparatus is comprised of:
   a fiber optic output coupler receiver means having a fiber optic;
   a first holder means rotatably attached to said receiver means;
   a first lens holding and aligning means rotatably connected to said first holder means wherein said first lens holding and aligning means is further comprised of;
   a first lens holder and aligner;
   a first retainer ring means rotatably connected to said first lens holder and aligner;
   a second lens holder and aligner substantially located within said first lens holder and aligner;
   a second holder means rotatably connected to said first lens holder and aligner; and
   a first lens retainer means operatively connected to said second holder means;
   a first lens means substantially located within said first holding and aligning means;
   a main body means rotatably connected to said first holder means such that said first holding and aligning means and said first lens means are substantially located within said main body means;
   a second lens holding and aligning means rotatably connected to said main body means;
   a second lens means substantially located within said second lens holding and aligning means; and
   a first fiber optic output coupler end means rotatably attached to said second lens holding and aligning means.

2. The apparatus, as in claim 1, wherein said first lens means is further comprised of:
   at least one optical element.

3. The apparatus, as in claim 1, wherein said first lens means is further comprised of:
   a first lens substantially located within said first lens holder and aligner; and
   a second lens substantially within said second lens holder and aligner.

4. The apparatus, as in claim 1, wherein said second lens holding and aligning means is further comprised of:
   a third lens holder and aligner;
   a second retainer ring means rotatably attached to said third lens holder and aligner;
   a fourth lens holder and aligner substantially located within said third lens holder and aligner;
   a third holder means rotatably connected to said third lens holder and aligner; and
   a second lens retainer means operatively connected to said third holder means.

5. The apparatus, as in claim 4, wherein said second lens means is further comprised of:
   a third lens substantially located within said third lens holder and aligner; and
   a fourth lens substantially located within said fourth lens holder and aligner.

6. The apparatus, as in claim 1, wherein said second lens means is further comprised of:
   at least one optical element.

7. A method of making a lens holding system for a fiber optic output coupler using an apparatus comprising a fiber optic output coupler receiver means having a fiber optic, a first holder means, a first lens holding and aligning means having first and second lens holders and aligners, a second holder means and a first lens retainer, a first lens means having first and second lens, a main body means, a second lens holding and aligning means having third and fourth lens holders and aligners, a third holder means, a second lens retainer, a second lens means having third and fourth lens, and a fiber optic output coupler end means, wherein said method is comprised of the steps of:

retaining said first lens holding and aligning means in said first holder means;
  aligning said first lens means in said first lens holding and aligning means wherein said step of aligning said first lens means is further comprised of the steps of:
  placing said first lens in said first lens holder and aligner;
  placing said second holder and aligner substantially over an edge of said first lens;
  holding said first lens and said second holder and aligner in place by said second holder means;
  emitting an alignment beam from said fiber optic;
  impinging said alignment beam on said first lens;
  rotating said first lens and said first lens holder and such that a collimated beam is emitted from said first lens and said first lens is aligned; and
  holding said first lens in said aligned position;
  holding said first lens means in said first lens holding and aligning means;
  securing said main body means to said first holder means such that said first lens holding and aligning means and said first and second lens are substantially located within said main body means;
  retaining said second lens holding and aligning means in said main body means;
  aligning said second lens means in said second lens holding and aligning means wherein said step of aligning said second lens is further comprised of the steps of:
  placing said second lens in said second lens holder and aligner;
  holding said second lens in said second aligner by said first retainer such that said first retainer substantially holds an edge of said second lens; and
  holding said first retainer substantially against said second holder means to keep said second lens in an aligned position;
  holding said second lens means in said second lens holding and aligning means; and
  securing said fiber optic output coupler end means to said second lens holding and aligning means.

8. The method, as in claim 7, wherein said step of aligning said third lens is further comprised of the steps of:
  placing said third lens in said third lens holder and aligner;
  placing said fourth holder and aligner substantially over an edge of said third lens;
  holding said third lens and fourth holder and aligner in place by said third holder means
  emitting an alignment beam from said fiber optic;
  impinging said alignment beam on said third lens;
  rotating said third lens and said third lens holder and aligner such that a collimated beam is emitted from said third lens and said third lens is aligned; and
  holding said third lens in said aligned position.

9. The method, as in claim 7, wherein said step of aligning said fourth lens is further comprised of the steps of:
  placing said fourth lens in said fourth lens holder and aligner;
  holding said fourth lens in said fourth aligner by said second lens retainer such that said second lens retainer substantially holds an edge of said fourth lens; and
  holding said second lens retainer substantially against said third holder means to keep said fourth lens in an aligned position.

* * * * *